(12) United States Patent
Travis

(10) Patent No.: US 6,647,922 B1
(45) Date of Patent: Nov. 18, 2003

(54) BIRDBATH METHOD AND APPARATUS

(76) Inventor: Ronald W. Travis, 3444 Laurel Green, Kennsaw, GA (US) 30144

( * ) Notice: Subject to any disclaimer, the term of this patent is extended or adjusted under 35 U.S.C. 154(b) by 0 days.

(21) Appl. No.: 10/229,847

(22) Filed: Aug. 27, 2002

(51) Int. Cl.[7] .............................................. A01K 45/00
(52) U.S. Cl. ...................................................... 119/69.5
(58) Field of Search ............................ 119/69.5, 72, 74; D30/123; D23/201; 239/23; 4/488, 492, 508, 509, 513

(56) References Cited

U.S. PATENT DOCUMENTS

| | | | |
|---|---|---|---|
| 782,612 A | * | 2/1905 | Levy ............................ 239/23 |
| 1,762,316 A | | 6/1930 | Wilson |
| 1,779,746 A | | 10/1930 | Murdey |
| 1,841,880 A | | 1/1932 | Dalton |
| 2,201,901 A | | 5/1940 | Keen |
| 2,274,678 A | | 3/1942 | Eliason |
| 3,181,558 A | | 5/1965 | Straub |
| 3,384,109 A | | 5/1968 | Stroburg |
| 3,584,642 A | | 6/1971 | Wilson |
| 4,441,459 A | | 4/1984 | Giordano |
| 4,630,569 A | | 12/1986 | Dieleman |
| 5,311,838 A | | 5/1994 | Thomas |
| 5,743,212 A | | 4/1998 | Forjohn |
| 5,784,998 A | | 7/1998 | Manzer |
| 5,881,753 A | | 3/1999 | Bowling |
| 5,931,118 A | * | 8/1999 | Thompson ................ 119/69.5 |
| 6,079,951 A | * | 6/2000 | Morton ...................... 119/69.5 |
| 6,202,594 B1 | * | 3/2001 | Kirschner .................... 119/72 |
| 6,220,828 B1 | * | 4/2001 | Lau ............................. 4/492 |
| 6,223,359 B1 | * | 5/2001 | Oltmanns et al. ............. 4/508 |
| 6,253,390 B1 | * | 7/2001 | Laks ........................... 4/488 |
| 6,484,666 B1 | * | 11/2002 | Reusche .................... 119/69.5 |

* cited by examiner

Primary Examiner—Charles T. Jordan
Assistant Examiner—Elizabeth Shaw

(57) ABSTRACT

An automatic birdbath filling system (10) and method are provided in which a water control valve (22) is controlled by a water level switch (32). The water level switch (32) and its holder (34) are placed, without the need for fixation devices, into a birdbath (12), thus allowing for existing birdbaths to be easily converted into automatically filling birdbaths.

21 Claims, 2 Drawing Sheets

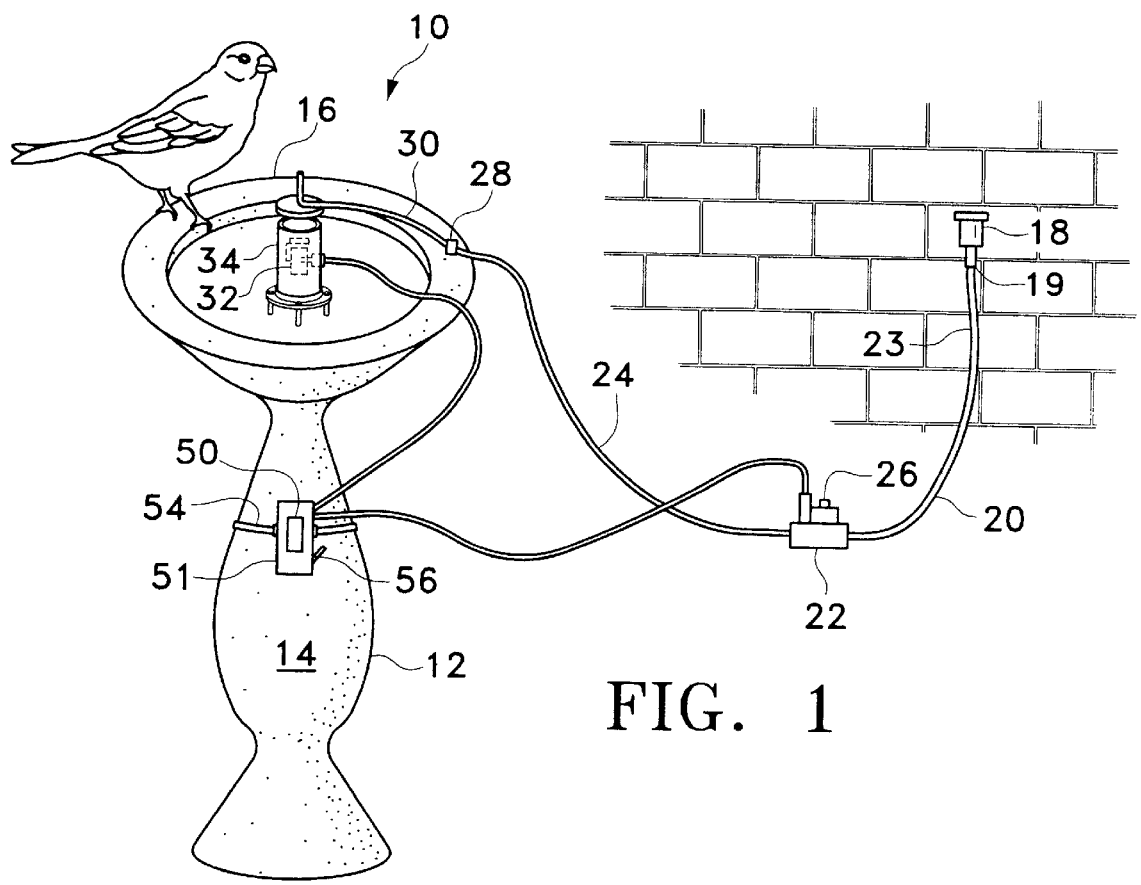
FIG. 1
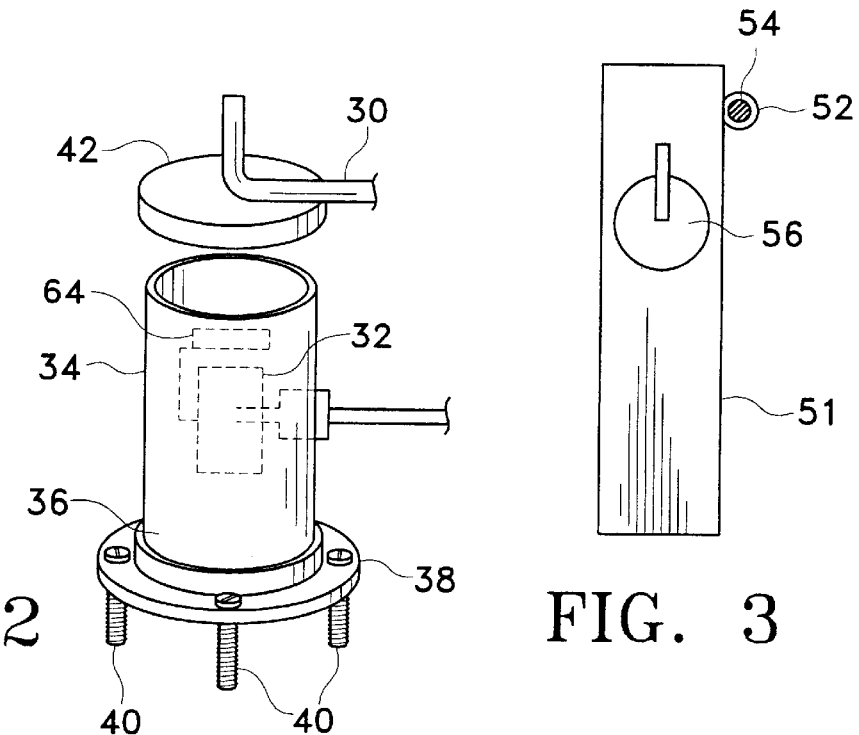
FIG. 2
FIG. 3

BIRDBATH METHOD AND APPARATUS

TECHNICAL FIELD OF THE INVENTION

This invention relates generally to automatic filling systems, and more particularly to a birdbath method and apparatus.

BACKGROUND OF THE INVENTION

Birdbaths are commonly used to attract birds, usually for the pleasure of bird watching. Of course, birds are not as attracted to empty or dirty birdbaths.

Therefore, there is a need to regularly fill and clean birdbaths. While this can be accomplished manually, it is usually not done as often as it should be, and therefore birdbaths generally do not provide the regular kind of enjoyment that they could.

Efforts have been made to create systems for automatically filling birdbaths. Unfortunately, these systems are often expensive, and require that the birdbaths be manufactured to accommodate the automatic system, or require fairly significant modifications to existing birdbaths to retrofit the automatic system to the birdbath.

Therefore, a need has arisen for an automatic birdbath filling system and method that is inexpensive and that does not require modification of the birdbath with which it will be used.

SUMMARY OF THE INVENTION

In accordance with the teachings of the present invention, methods and apparatus for birdbaths are provided which substantially eliminate or reduce problems and disadvantages associated with prior art systems.

In a particular embodiment, an automatic birdbath filling system is provided that includes a water supply, a sensor operable to sense at least one water level, a power source, and an electrically operated valve coupled to the power source and the water supply, the electrically operated valve opening in response to the sensor sensing a low water level.

In more specific embodiments, the system may include the following, either alone or in combination: a leveling system for the sensor; a leveling system that comprises a plurality of leveling screws; a sensor housing coupled to the sensor; a height adjustment system for the sensor; a sensor housing having a weighted base; a sensor housing coupled to the sensor and located in but unattached to a birdbath bowl; a transmitter coupled to the sensor and operable to transmit a signal indicating a low water condition and a receiver coupled to the electrically operated valve, the electrically operated valve opening in response to the receiver receiving the low water condition signal; a flow control valve downstream of the electrically operated valve for controlling the water flow rate; a case for the power source; a valve housing enclosing the electrically operated valve, the power source, or the receiver, if used.

Also provided is a method of automatically filling a birdbath, which, in a particular embodiment, includes supplying water, placing a sensor in a birdbath bowl, the sensor sensing at least one water level, and electrically opening a valve in response to the sensor sensing a low water level to allow the supplied water to flow into the birdbath bowl.

In more specific embodiments, the method may include the following, either alone or in combination: leveling the sensor; adjusting the height of the sensor; keeping the sensor unattached from the birdbath bowl; transmitting through the air a signal indicating a low water condition and receiving the low water condition signal and electrically opening the valve in response to the low water condition signal; closing the valve in response to the sensor sensing a high water level; closing the valve after a predetermined time period has elapsed; and controlling the water flow rate downstream of the electrically operated valve.

An important technical advantage of the present invention is the fact that it includes an electrically operated water control valve.

Another important technical advantage of some embodiments of the present invention is the fact that they may be used in connection with existing birdbaths, without any need to structurally modify them. In particular, the system of the present invention may be used without having to drill holes or screw anything into existing birdbaths. This is accomplished in part by using a sensor that can be simply placed in the birdbath bowl, and the uncomplicated design of the overall system.

Still another important technical advantage of some embodiments of the present invention is the fact that its sensor may be easily leveled or adjusted in height to facilitate proper operation on a wide range of birdbath shapes, slopes, and sizes.

BRIEF DESCRIPTION OF THE DRAWINGS

Reference is made in the description to the following briefly described drawings, wherein like reference numerals refer to corresponding elements:

FIG. 1 illustrates a particular embodiment of a birdbath filling system according to the teachings of the present invention;

FIG. 2 illustrates a schematic of a particular embodiment of a combination switch and switch holder according to the teachings of the present invention;

FIG. 3 illustrates a schematic side view of a particular embodiment of a power case according to the teachings of the present invention;

DETAILED DESCRIPTION OF THE INVENTION

Figure 4:
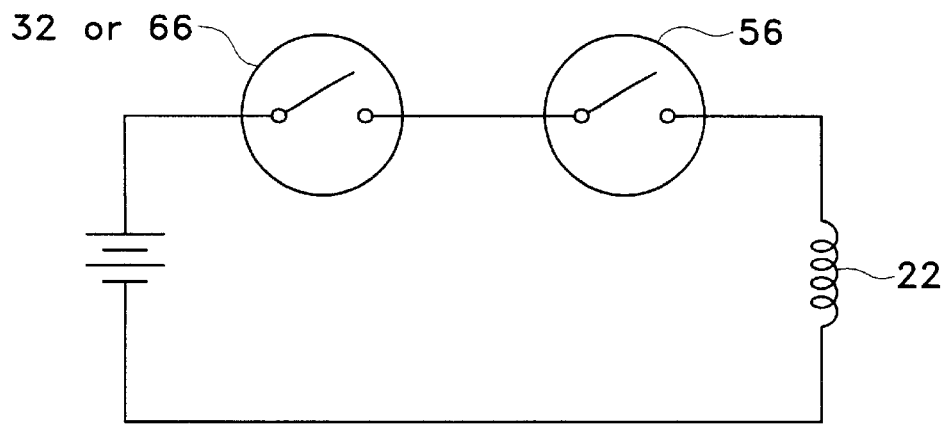
FIG. 4 illustrates a particular embodiment of an electrical circuit schematic according to the teachings of the present invention.

FIG. 1 illustrates a particular embodiment of an automatic birdbath filling system 10 according to the teachings of the present invention. As shown in FIG. 1, a birdbath 12 includes a pedestal 14 and a birdbath bowl 16. Water is supplied from a water source 18, which may comprise, without limitation, a water faucet such as is commonly used for outside water supply (for example for watering people's yards).

Water is supplied from the water supply 18 through a water line 20 and a water control valve 22. A check valve 19 may be included in the line 20. In a particular embodiment, water line 20 comprises a first section 23 between the water source 18 and the valve 22 and a second section 24 between the water control valve 22 and the birdbath bowl 16. In a preferred embodiment, section 23 is a high-pressure line, for example, without limitation, piping or a braided hose. However, no such high-pressure line is required.

In a preferred embodiment, the water control valve 22 is an electric solenoid valve. However, other valves may be used, such as, without limitation, electric ball valves. Herein, an electrically operated valve is a valve that is energized or controlled by an electric signal. Also, water control valve 22 may include or may be used in connection with a manual water bypass valve 26 for use in manually supplying water to the birdbath bowl 16, for example for cleaning or flushing out the birdbath bowl 16.

A flow control valve 28 may also be included in the water line for adjusting the flow rate of the water, as appropriate. Although not required, it is generally desirable for the filling to occur gently, and thus the valve 28 may be used to proved gentle filling rates. Water is discharged into the bowl 16 through the water line 20, which may include a section 30 between the manual control valve 28 (if included), and the birdbath bowl 16. It should be understood that flow rates may be controlled, if desired, by any suitable device, including, without limitation, automatic or manual flow control valves or orifices. For cleaning, it may be desirable to increase the flow rate by adjusting flow control valve 28.

The automatic filling of the present invention is controlled by a water level switch 32. Water level switch 32 may be housed, held by, or integrated with a switch holder 34. When the water in the birdbath bowl 16 falls below a low water level, the water level switch 32 sends a signal or otherwise operates to open the normally closed water valve 22, thereby causing the birdbath bowl 16 to fill. Once the water level rises to a high water level, the water level switch 32 operates to close the water valve 22, thereby shutting off the filling operation. The water level switch 32 may be, without limitation, a mechanical float switch, a reed switch, a combination of two reed switches and a reed relay, or a conductivity probe/switch combination, or indeed any sensor (even if not a switch) suitable for sensing water levels, among may other options.

The switch holder 34, as shown in detail in FIG. 2, is a housing, such as for example, a metal or PVC casing, which may be made, without limitation, out of a short section of pipe. Of course, the housing may be made of any suitable material, including, without limitation, ceramic, concrete, epoxy impregnated with stone, metal, PVC or other plastic. It may be desirable to cover the holder 34 with stones or other material to make it more aesthetically pleasing. Indeed, the holder 34 may be made in the appearance of, or covered with, a figurine, such as a stone, an animal, or person, or other shape, without limitation.

The holder 34 may preferably include a weighted base 36 (the weight may an integral part the base or a separate piece) to help insure that the level switch 32 and the holder 34 do not tip over in the bowl 16. As an example, the weight may be about 4 to 6 ounces. However, this weight is exemplary only, and greater or lesser weights may also be used. Furthermore, the holder 34 may include a leveling system, for example, without limitation, one including a bracket 38 and a plurality of leveling screws 40. This leveling system may be used to level the water level switch 32, or to raise or lower it, as appropriate, to insure proper operation. The ability to easily level, raise, or lower the switch 32 is one of several important technical advantages of the present invention. In particular, it allows birdbaths of many shapes, slopes, and sizes to be easily converted into automatically filling birdbaths. The section of water line 20 that discharges into the birdbath bowl 16, for example line 30 shown in FIG. 1, may be attached to the holder 34. It is preferable, but not required, that the line 30 be held so that it discharges above the water level, for example above the height of the bowl 16. The line 30 may be held by the holder 34, for example by a line holder 42. The line holder 42 may comprise, without limitation, a clamp or a feature through which the line passes (such as, without limitation, a loop). If desired, the line may be fixed to the holder 34 or line holder 42, such as, without limitation, with epoxy or other suitable approaches.

Power to control the valve 22 is provided from a power source 50, which may comprise, without limitation, a 9-volt battery, a combination of batteries, a solar cell, a DC or AC power source, or any other suitable power supply. As shown in FIGS. 1 and 3, the power source may be provided in a case 51 (although it may be located anywhere, including, without limitation, as part of or within holder 34). Case 51 may be coupled to the pedestal 14 if desired, but may be located anywhere, and need not be coupled to the pedestal 14. As shown in FIG. 3, the back of the case 51 may be provided with an eye 52 through which a strap 54 passes. The strap 54 may be used to simply strap the power case 51 to the pedestal 14. Although an eye 52 and strap 54 are illustrated, any suitable coupling device may be used.

Electrical lines run from the power source 50 to the water level switch 32 and the water control valve 22, as schematically shown in FIG. 4. A master on/off switch 56 may be included, for example on the case 51, for turning the automatic system 10 on and off. As shown in FIG. 4, the valve 22, which is represented as a solenoid coil, is energized when the master on/off switch 56 is closed (representing the 'on' condition) and the water level switch 32 is closed (representing a fill condition). It should be understood that the particular circuit shown in FIG. 4 is exemplary, only, and other logic circuits may be used without departing from the intended scope herein. For example, without limitation, the system may be configured to cause opening of the water control valve 22 on a low water condition, with the valve 22 then closing after some period of time or a given volume is delivered, rather than upon sensing a high water level.

As can be seen from this description, the present invention allows a conventional birdbath to be automatically filled simply by placing the switch holder 34 in the birdbath bowl 16 and connecting the water and power supply. No brackets, screws, or other fixation devices are used to couple the water level switch 32 to the birdbath 12. The switch holder is simply placed in the bowl, and leveled, raised, or lowered, if necessary. No alterations need be made to the birdbath 12. Of course, the holder could be fixed to the birdbath 12 if desired, but no such fixation is necessary.

Figure 5:
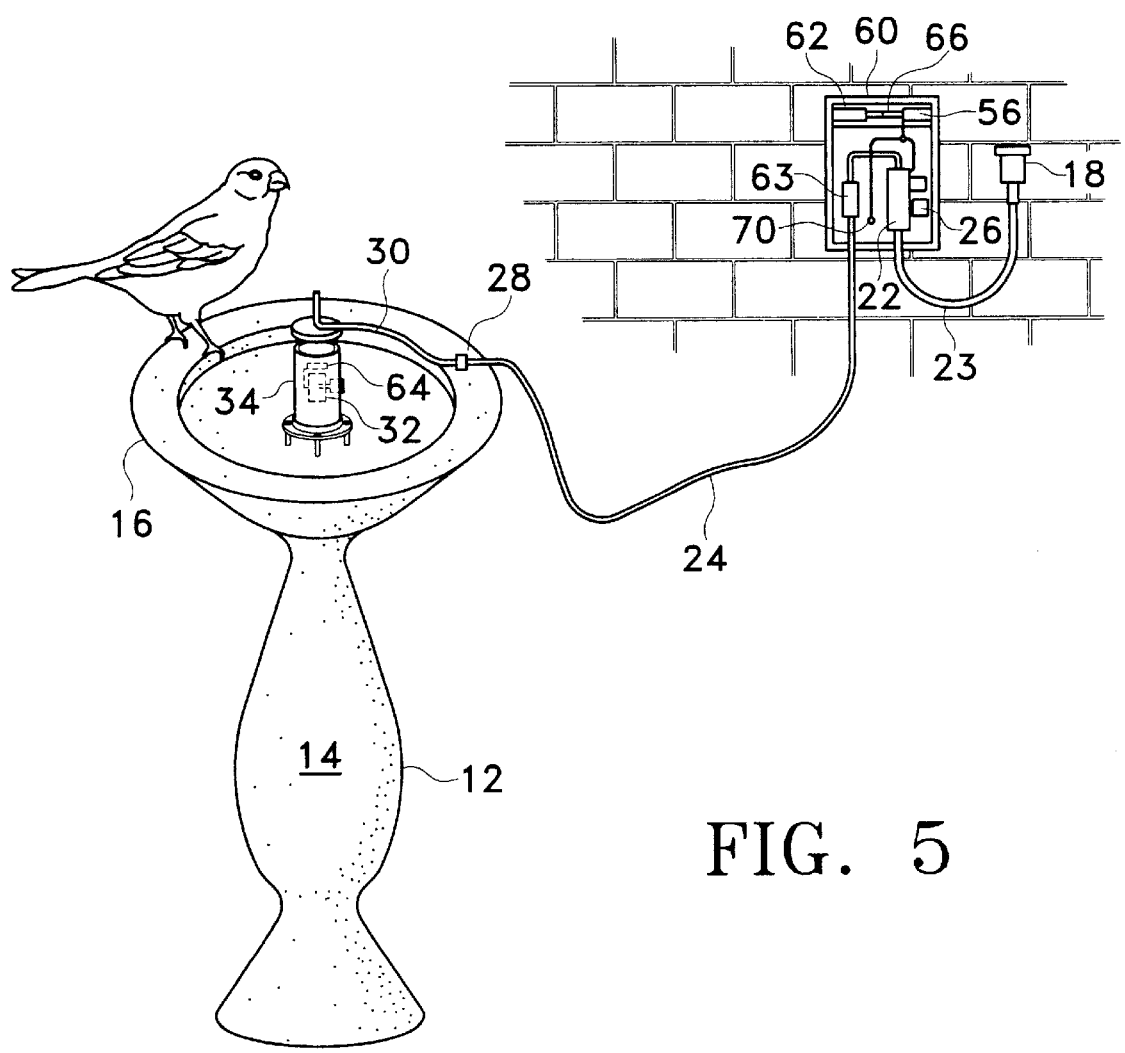
FIG. 5 illustrates another embodiment of a system according to the teachings of the present invention.

FIG. 5 illustrates an alternative embodiment of the present invention in which the water control valve 22 and the power source (illustrated as power source 62) are included in a single housing 60. A water line check valve 63 may also be included in the housing 60. The housing 60 may be located in any suitable location, including, without limitation, next to the water source (for example coupled to a wall), in or on the ground, or on the birdbath 12, such as by strapping as described in connection with case 51. It should be understood that any of the elements depicted in the housing 60 may also be located outside the housing 60. To minimize wiring distances, it may be preferred to locate the housing 60 close to the water level switch 32. However, where a plug-in power source (such as a DC power source) is used, it may be preferred to locate the housing 60 close to a power receptacle.

To avoid the need for wiring between the water level control switch 32 and the water control valve 22, a transmitter 64, such as, without limitation, a radio frequency transmitter, may be coupled to the water level control switch 32 for sending control signals to the water control valve 22 as the switch 32 changes in response to the water level. In such a case, the power for the transmitter 64 may be supplied locally, for example, without limitation, as part of the holder 34 or within a case 51 such as shown in FIG. 1. As shown in FIG. 5, a receiver 66 may be included within the housing 60 for receiving signals from the transmitter 64. As shown in FIG. 4, schematically, the receiver 66 operates to open and close the water control valve 22, in combination with the master on/off switch 56. It should be understood that the transmitter/receiver approach may be used in connection with any embodiment of the present invention, including where no housing 60 is used.

In operation of one embodiment of the present invention, the master on/off switch 56 is turned on thus enabling operation of the system. Water from the source 18 is turned on, thus bringing water to the water control valve 22. When water falls below a low water level, the water level switch 32 (which, as discussed above, may be any suitable switch or other sensor) controls the water control valve 22 to open the valve, thus allowing water to flow into the birdbath bowl 16 for filling. Once the water level reaches a high water level, the water level switch 32 controls the water control valve 22 to turn it off, thus stopping the filling operation. Filling may also be stopped after a given amount of time or a given volume has been delivered, rather than upon sensing of a high water level.

An LED 70 may be included as part of the present invention, either in connection with the housing 60 of FIG. 5 or the power case 51 shown in FIG. 1, to indicate when the water control valve 22 is energized. For example, the LED could be coupled parallel to water control valve. Thus, the LED would indicate when the water control valve 22 should be on, and filling occurring. If the LED 70 is on, and the water is not filling, then the user is notified that either the water from the water source 18 has not been turned on, or the battery or other power source is not able to deliver enough power to open the water control valve 22, or the manual control valve 28, or other valve, if included, is shut. Thus, the LED, can be a simple troubleshooting tool.

It should be understood that features described in connection with particular embodiments may be combined with any of the other embodiments described herein. Furthermore, although the present invention has been described in detail, it should be understood that various changes, substitutions, alterations, additions, or modifications may be made without departing from the intended scope of the invention, as defined in the following claims.

What is claimed is:

1. An automatic birdbath filling system, comprising:
   a water supply;
   a sensor operable to sense at least one water level;
   a power source;
   an electrically operated valve coupled to the power source and the water supply, the electrically operated valve opening in response to the sensor sensing a low water level; and
   a leveling system coupled to the sensor.

2. The system of claim 1, wherein the leveling system comprises a plurality of leveling screws.

3. The system of claim 1, and further comprising a sensor housing coupled to the sensor, and wherein the leveling system is coupled to the sensor housing.

4. An automatic birdbath filling system, comprising:
   a water supply;
   a sensor operable to sense at least one water level;
   a power source;
   an electrically operated valve coupled to the power source and the water supply, the electrically operated valve opening in response to the sensor sensing a low water level; and
   a height adjustment system coupled to the sensor.

5. An automatic birdbath filling system, comprising:
   a water supply;
   a sensor operable to sense at least one water level;
   a power source;
   an electrically operated valve coupled to the power source and the water supply, the electrically operated valve opening in response to the sensor sensing a low water level; and
   a sensor housing coupled to the sensor, the sensor housing having a weighted base.

6. An automatic birdbath filling system, comprising:
   a water supply;
   a sensor operable to sense at least one water level;
   a power source;
   an electrically operated valve coupled to the power source and the water supply, the electrically operated valve opening in response to the sensor sensing a low water level;
   a birdbath bowl; and
   a sensor housing coupled to the sensor, the sensor housing located in but unattached to the birdbath bowl.

7. The system of claim 6, and further comprising:
   a transmitter coupled to the sensor and operable to transmit a signal indicating a low water condition; and
   a receiver coupled to the electrically operated valve, the electrically operated valve opening in response to the receiver receiving the low water condition signal.

8. The system of claim 6, and further comprising a case, the power source being located within the case.

9. The system of claim 6, and further comprising a valve housing, the valve housing enclosing the electrically operated valve.

10. The system of claim 9, wherein the power source is enclosed within the valve housing.

11. The system of claim 10, and further comprising:
    a transmitter coupled to the sensor and operable to transmit a signal indicating a low water condition; and
    a receiver located within the valve housing and coupled to the electrically operated valve, the electrically operated valve opening in response to the receiver receiving the low water condition signal.

12. The system of claim 6, wherein the sensor is a switch.

13. An automatic birdbath filling system, comprising:
    a water supply;
    a sensor operable to sense at least one water level;
    a power source;
    an electrically operated valve coupled to the power source and the water supply, the electrically operated valve opening in response to the sensor sensing a low water level; and
    a flow control valve downstream of the electrically operated valve, the flow control valve operable to control water flow rate.

14. A method of automatically filling a birdbath, comprising:
    supplying water;
    placing a sensor in a birdbath bowl, the sensor sensing at least one water level;

electrically opening a valve in response to the sensor sensing a low water level to allow the supplied water to flow into the birdbath bowl; and leveling the sensor.

15. A method of automatically filling a birdbath, comprising:

supplying water;

placing a sensor in a birdbath bowl, the sensor sensing at least one water level;

electrically opening a valve in response to the sensor sensing a low water level to allow the supplied water to flow into the birdbath bowl; and adjusting the height of the sensor.

16. A method of automatically filling a birdbath, comprising:

supplying water;

operating a sensor in a birdbath bowl, the sensor sensing at least one water level, wherein the sensor is unattached to the birdbath bowl; and electrically opening a valve in response to the sensor sensing a low water level to allow the supplied water to flow into the birdbath bowl.

17. The method of claim 16, and further comprising:

transmitting through the air a signal indicating a low water condition; and receiving the low water condition signal and electrically opening the valve in response to the low water condition signal.

18. The method of claim 16, and further comprising closing the valve in response to the sensor sensing a high water level.

19. The method of claim 16, and further comprising closing the valve after a predetermined time period has elapsed.

20. A method of automatically filling a birdbath, comprising:

supplying water;

placing a sensor in a birdbath bowl, the sensor sensing at least one water level;

electrically opening a valve in response to the sensor sensing a low water level to allow the supplied water to flow into the birdbath bowl; and controlling water flow rate downstream of the electrically operated valve.

21. An automatic birdbath filling system, comprising:

a water supply;

a birdbath bowl;

a sensor operable to sense a low water level, the sensor located in but not attached to the birdbath bowl with any device that alters the birdbath bowl; and a valve coupled to the water supply, the valve opening to allow the water supply to supply the birdbath bowl in response to the sensor sensing the low water level.

* * * * *